US012746559B2

(12) United States Patent
Wei et al.

(10) Patent No.: US 12,746,559 B2
(45) Date of Patent: Sep. 29, 2026

(54) SHOWERHEAD STORED WITH CLEANING LIQUID

(71) Applicant: Beijing Kohler Ltd., Beijing (CN)

(72) Inventors: Shaopei Wei, Beijing (CN); Sai Yang, Beijing (CN)

(73) Assignee: Beijing Kohler Ltd., Beijing (CN)

( * ) Notice: Subject to any disclaimer, the term of this patent is extended or adjusted under 35 U.S.C. 154(b) by 279 days.

(21) Appl. No.: 18/531,343

(22) Filed: Dec. 6, 2023

(65) Prior Publication Data

US 2024/0189841 A1 Jun. 13, 2024

(30) Foreign Application Priority Data

Dec. 8, 2022 (CN) ........................ 202223295776.X

(51) Int. Cl.
*B05B 7/24* (2006.01)
*B05B 1/18* (2006.01)
(Continued)

(52) U.S. Cl.
CPC .............. *B05B 7/2445* (2013.01); *B05B 1/18* (2013.01); *B05B 1/3026* (2013.01); (Continued)

(58) Field of Classification Search
CPC ........... B05B 7/24; B05B 11/00; B05B 11/01; B05B 7/0408; B05B 7/2443; B05B 1/18; (Continued)

(56) References Cited

U.S. PATENT DOCUMENTS 5,174,503 A 12/1992 Gasaway
6,000,626 A * 12/1999 Futo .................... A46B 11/066 239/526

(Continued)

FOREIGN PATENT DOCUMENTS

CN 103721872 A 4/2014
CN 104665672 B 6/2015

(Continued)

OTHER PUBLICATIONS

Canopy, "Filtered Showerhead," retrieved from https://getcanopy.co/products/the-canopy-filtered-shower-head on Mar. 6, 2024, 13 pages.

(Continued)

*Primary Examiner* — Lorne E Meade
*Assistant Examiner* — Alyson Joan Harrington
(74) *Attorney, Agent, or Firm* — Foley & Lardner LLP

(57) ABSTRACT

A shower device includes a shower device body. The shower device body includes a body water channel, a shower head with spray holes, a storage box for storing cleaning liquid, a control valve, and a one-way valve. The shower head is connected to the shower device body, and the spray holes are fluidly coupled to the body water channel. The storage box includes a liquid inlet and a liquid outlet and is installed in the shower device body. The liquid inlet and the liquid outlet are fluidly coupled to the body water channel respectively. The control valve is installed in the liquid inlet and is configured to control opening and closing of the liquid inlet. The one-way valve is installed in the liquid outlet.

7 Claims, 11 Drawing Sheets

(51) Int. Cl.
*B05B 1/30* (2006.01)
*B05B 7/12* (2006.01)
*B05B 7/04* (2006.01)

(52) U.S. Cl.
CPC .............. *B05B 7/1209* (2013.01); *B05B 7/24* (2013.01); *B05B 7/244* (2013.01); *B05B 7/2443* (2013.01); *B05B 7/0408* (2013.01)

(58) Field of Classification Search
CPC ................ B05B 7/2445; B05B 7/0425; B05B 7/2405; B05B 7/30; B05B 7/12; B05B 7/1209; B05B 12/002; B05B 12/0022; B05B 12/0024; B01F 25/316
See application file for complete search history.

(56) References Cited

U.S. PATENT DOCUMENTS

| | | | |
|---|---|---|---|
| 6,016,977 A | 1/2000 | Farley | |
| 6,041,971 A | 3/2000 | Pineda | |
| 6,796,518 B2 | 9/2004 | Douglas et al. | |
| 6,951,286 B2 | 10/2005 | Mueller | |
| RE39,142 E | 6/2006 | Farley | |
| 7,228,874 B2 | 6/2007 | Bolderheij et al. | |
| 7,611,070 B2 | 11/2009 | Paoluccio | |
| 7,975,936 B2 | 7/2011 | Paoluccio | |
| 8,566,972 B2 | 10/2013 | Vogtner et al. | |
| 8,663,691 B2 | 3/2014 | Jeong | |
| 8,702,018 B1 | 4/2014 | Rivera | |
| 8,820,660 B2 | 9/2014 | Ajagbe | |
| 8,967,499 B2 | 3/2015 | Lee | |
| 9,085,006 B2 | 7/2015 | Wu et al. | |
| 9,089,662 B2 | 7/2015 | Feriani et al. | |
| 9,095,671 B2 | 8/2015 | Feriani et al. | |
| 9,156,052 B2 | 10/2015 | Cai et al. | |
| 9,242,259 B2 | 1/2016 | Jeronimus | |
| 9,322,152 B2 | 4/2016 | Kawamoto | |
| 9,359,748 B1 | 6/2016 | Lamy et al. | |
| 9,438,977 B2 | 9/2016 | Wang et al. | |
| 9,474,871 B2 | 10/2016 | Feriani et al. | |
| 9,521,898 B2 | 12/2016 | Knight | |
| 9,643,195 B2 | 5/2017 | Streetmaker | |
| 9,982,420 B1 | 5/2018 | Romaine | |
| 10,046,345 B2 | 8/2018 | Johann | |
| 10,221,545 B2 | 3/2019 | Saro | |
| 10,240,328 B1 | 3/2019 | Estelhomme | |
| 10,265,714 B2 | 4/2019 | Johann | |
| 10,471,443 B2 | 11/2019 | Chien et al. | |
| 10,512,923 B2 | 12/2019 | Farcet et al. | |
| 10,556,244 B2 | 2/2020 | Benitez | |
| 10,562,044 B2 | 2/2020 | Sunshine | |
| 10,577,783 B2 | 3/2020 | Farcet et al. | |
| 10,737,203 B2 | 8/2020 | Farley | |
| 10,801,192 B2 | 10/2020 | Wilson | |
| 10,900,207 B1 | 1/2021 | Slaughter | |
| 11,185,875 B2 | 11/2021 | Koehler et al. | |
| 11,192,134 B2 | 12/2021 | Farley | |
| 11,311,151 B2 | 4/2022 | Nowotarski | |
| 11,319,697 B2 | 5/2022 | Gong et al. | |
| 11,399,668 B2 | 8/2022 | Wu et al. | |
| 11,541,408 B2 | 1/2023 | Cohen et al. | |
| 11,666,931 B2 | 6/2023 | Guthrie et al. | |
| 2009/0045268 A1 | 2/2009 | Selander et al. | |
| 2009/0308951 A1* | 12/2009 | Suter | A01K 13/001 4/615 |
| 2010/0065665 A1* | 3/2010 | Whitaker | B05B 1/18 239/562 |
| 2015/0375147 A1 | 12/2015 | Cai et al. | |
| 2020/0122166 A1 | 4/2020 | Farley | |
| 2021/0094844 A1 | 4/2021 | Douglas et al. | |
| 2021/0394094 A1 | 12/2021 | Wilkinson | |
| 2022/0056678 A1 | 2/2022 | Guthrie et al. | |
| 2022/0080436 A1 | 3/2022 | Koehler et al. | |
| 2022/0193699 A1 | 6/2022 | Lin et al. | |
| 2022/0213672 A1 | 7/2022 | Wilson | |
| 2022/0372737 A1 | 11/2022 | Mesarina | |
| 2022/0379321 A1 | 12/2022 | Edwards et al. | |
| 2022/0396937 A1 | 12/2022 | Slaughter | |
| 2023/0160193 A1 | 5/2023 | Nammour | |
| 2023/0191432 A1 | 6/2023 | Cohen et al. | |
| 2023/0212845 A1 | 7/2023 | Lee et al. | |
| 2024/0024908 A1 | 1/2024 | Chen et al. | |

FOREIGN PATENT DOCUMENTS

| | | | |
|---|---|---|---|
| CN | 106216115 | A | 12/2016 |
| CN | 108607700 | A | 10/2018 |
| CN | 108607701 | A | 10/2018 |
| CN | 208554654 | U | 3/2019 |
| CN | 208830415 | U | 5/2019 |
| CN | 210207264 | U | 3/2020 |
| CN | 210434704 | U | 5/2020 |
| CN | 210614057 | U | 5/2020 |
| CN | 111346745 | B | 6/2020 |
| CN | 111547876 | A | 8/2020 |
| CN | 111957449 | A | 11/2020 |
| CN | 211964629 | U | 11/2020 |
| CN | 112058515 | B | 12/2020 |
| CN | 212041043 | U | 12/2020 |
| CN | 112317149 | B | 2/2021 |
| CN | 212441670 | U | 2/2021 |
| CN | 212702495 | U | 3/2021 |
| CN | 212791468 | U | 3/2021 |
| CN | 212820542 | U | 3/2021 |
| CN | 112756120 | A | 5/2021 |
| CN | 112871482 | A | 6/2021 |
| CN | 113070159 | | 7/2021 |
| CN | 113209676 | A | 8/2021 |
| CN | 214160095 | U | 9/2021 |
| CN | 214320566 | U | 10/2021 |
| CN | 214347267 | U | 10/2021 |
| CN | 214515347 | U | 10/2021 |
| CN | 213409085 | U | 11/2021 |
| CN | 214599831 | U | 11/2021 |
| CN | 214766273 | U | 11/2021 |
| CN | 214974955 | U | 12/2021 |
| CN | 215429661 | U | 1/2022 |
| CN | 215541884 | U | 1/2022 |
| CN | 114074034 | A | 2/2022 |
| CN | 114950757 | B | 8/2022 |
| CN | 115041312 | A | 9/2022 |
| CN | 115106209 | A | 9/2022 |
| CN | 115106212 | A | 9/2022 |
| CN | 115318457 | B | 11/2022 |
| CN | 115318462 | A | 11/2022 |
| CN | 217747530 | U | 11/2022 |
| CN | 217856758 | U | 11/2022 |
| CN | 217910974 | U | 11/2022 |
| CN | 115445800 | A | 12/2022 |
| CN | 115475708 | A | 12/2022 |
| CN | 217940554 | U | 12/2022 |
| CN | 217963009 | U | 12/2022 |
| CN | 217963010 | U | 12/2022 |
| CN | 217963011 | U | 12/2022 |
| CN | 218190351 | U | 1/2023 |
| CN | 218282186 | U | 1/2023 |
| CN | 218282187 | U | 1/2023 |
| CN | 218796596 | U | 4/2023 |
| CN | 218814086 | U | 4/2023 |
| CN | 218814092 | U | 4/2023 |
| CN | 116145773 | A | 5/2023 |
| CN | 116159682 | A | 5/2023 |
| CN | 116174182 | A | 5/2023 |
| CN | 219073266 | U | 5/2023 |
| CN | 219483039 | U | 8/2023 |
| DE | 20 2006 017 888 | U1 | 4/2007 |
| DE | 10 2011 102 584 | A1 | 11/2012 |
| EP | 2 431 541 | B1 | 3/2012 |
| EP | 2 933 006 | B1 | 6/2017 |
| EP | 3 960 942 | A1 | 3/2022 |
| GB | 2 550 143 | A | 11/2017 |
| KR | 20000054773 | A | 9/2000 |
| KR | 1020100106055 | A | 10/2010 |

(56) References Cited

FOREIGN PATENT DOCUMENTS

| | | | |
|---|---|---|---|
| KR | 102147222 | B1 | 8/2020 |
| KR | 1020200105077 | A | 9/2020 |
| KR | 1020220029803 | A | 3/2022 |
| KR | 2020220000616 | U | 3/2022 |
| KR | 102408119 | B1 | 6/2022 |
| KR | 1020220074432 | A | 6/2022 |
| KR | 102477448 | B1 | 12/2022 |
| WO | WO-2005/063104 | A1 | 1/1900 |
| WO | WO-2012/099460 | A1 | 7/2012 |
| WO | WO-2014/139185 | A1 | 9/2014 |
| WO | WO-2020/170154 | A1 | 8/2020 |
| WO | WO-2020/227965 | A1 | 11/2020 |
| WO | WO-2022/007775 | A1 | 1/2022 |
| WO | WO-2022/089692 | A1 | 5/2022 |
| WO | WO-2022/106600 | A2 | 5/2022 |
| WO | WO-2022/143650 | A1 | 7/2022 |
| WO | WO-2022/193960 | A1 | 9/2022 |
| WO | WO-2022/224165 | A1 | 10/2022 |
| WO | WO-2022/267731 | A1 | 12/2022 |
| WO | WO-2023/113146 | A1 | 6/2023 |

OTHER PUBLICATIONS

Jolie, “The Filtered Showerhead,” retrieved from https://jolieskinco.com/products/the-jolie-showerhead?variant=41313550893213 on Mar. 6, 2024, 28 pages.

Kohler, “Loure single-function showerhead,” retrieved from https://www.kohler.com/en/products/showers/shop-shower-heads/loure-2-5-gpm-single-function-showerhead-with-katalyst-air-induction-technology-14786 on Mar. 6, 2024, 2 pages.

Kohler, “Purist single-function showerhead,” retrieved from https://www.kohler.com/en/products/showers/shop-shower-heads/purist-2-5-gpm-single-function-wall-mount-showerhead-with-katalyst-air-induction-technology-965-ak on Mar. 6, 2024, 2 pages.

Vitaclean, “Wall Mount Shower Head Starter Kit,” retrieved from https://vitacleanhq.com/products/wall-mount-shower-starter-kit on Mar. 6, 2024, 6 pages.

* cited by examiner

SHOWERHEAD STORED WITH CLEANING LIQUID

CROSS-REFERENCE TO RELATED PATENT APPLICATIONS

This application claims the benefit of priority to Chinese Utility Model Patent App. No. 202223295776.X, filed Dec. 8, 2022, the entirety of which is incorporated herein by reference.

BACKGROUND

The present application relates generally to the field of shower equipment, and particularly to a shower device. In the sanitary industry, the existing shower device only has a function of spraying water for cleaning. When showering, users will first adjust the water temperature and wet the body, then apply cleaning liquid, and finally rinse it off.

When applying the cleaning liquid by hand, the application of the cleaning liquid may not be uniform, and some areas may not be coated. When bathing pets, the above-mentioned defects are especially obvious because the range of pet hair is relatively large, and the hair is long. It is not easy to evenly apply cleaning liquid and may be necessary to re-apply the cleaning liquid several times making the application process tedious.

SUMMARY

One embodiment relates to a shower device that includes a shower device body. The shower device body includes a body water channel, a shower head with spray holes, a storage box for storing cleaning liquid, a control valve, and a one-way valve. The shower head is connected to the shower device body, and the spray holes are fluidly coupled to the body water channel. The storage box includes a liquid inlet and a liquid outlet and is installed in the shower device body. The liquid inlet and the liquid outlet are fluidly coupled to the body water channel respectively. The control valve is installed in the liquid inlet and is configured to control opening and closing of the liquid inlet. The one-way valve is installed in the liquid outlet.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
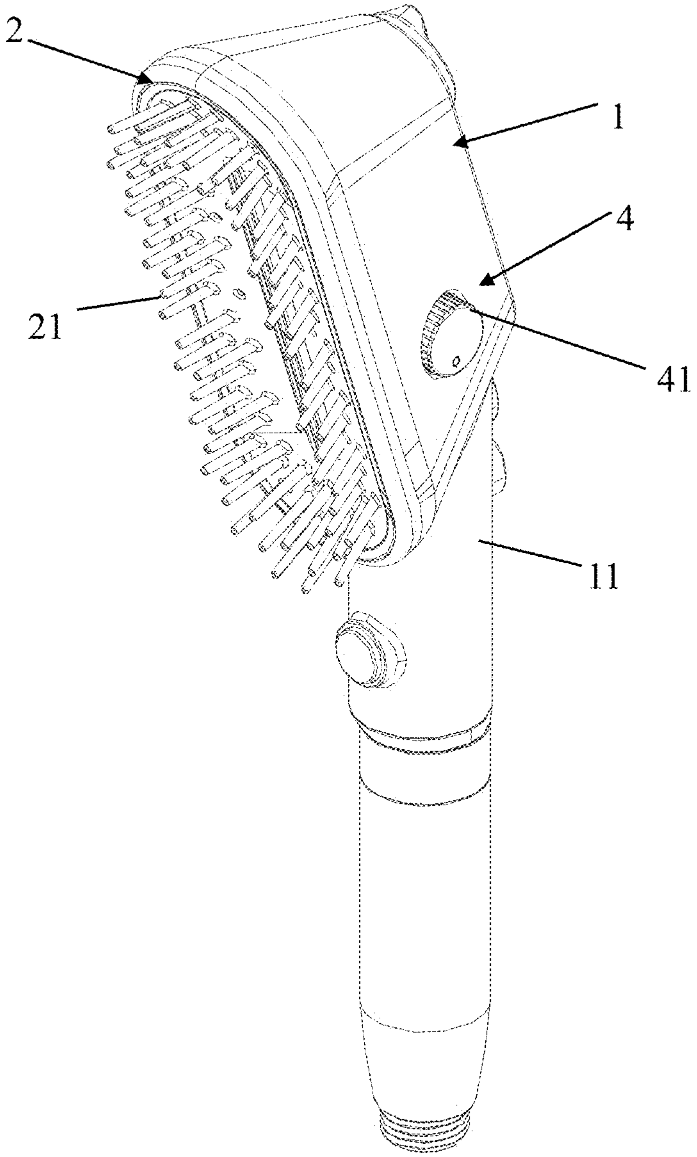
FIG. 1 is a perspective view of a shower device, according to an exemplary embodiment.
Figure 2:
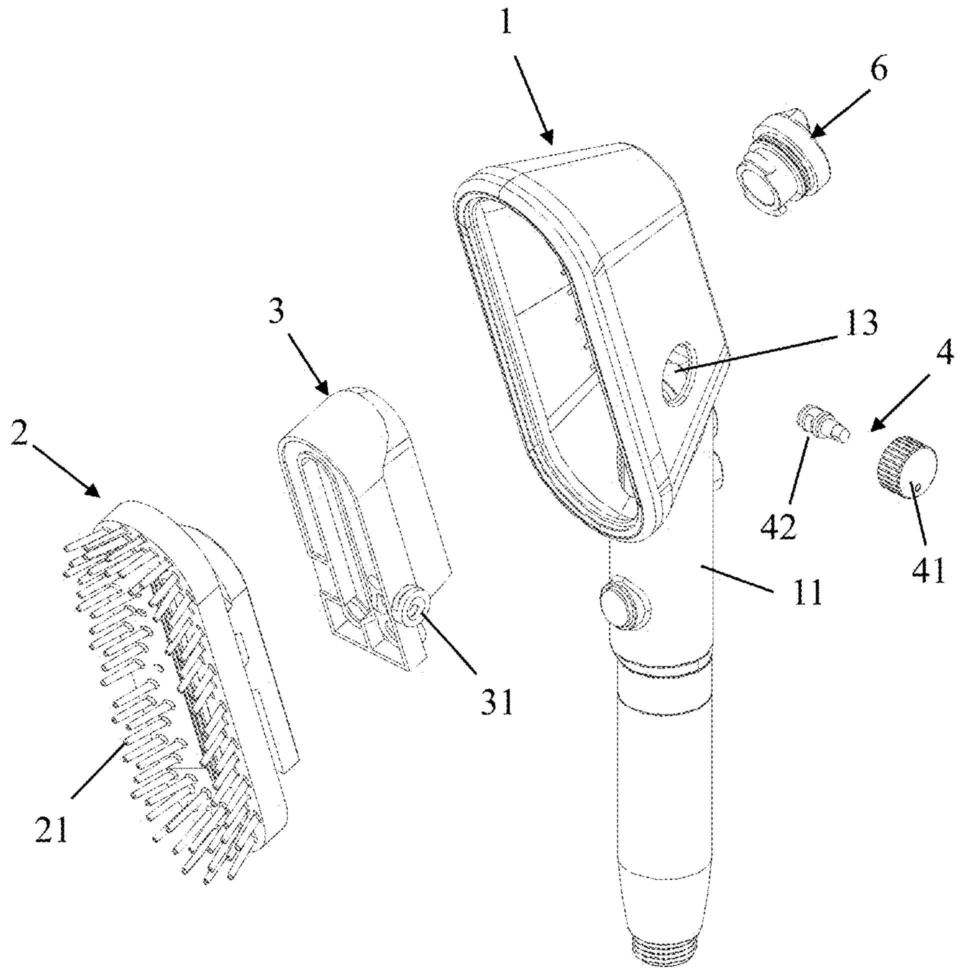
FIG. 2 is an exploded view of the shower device of FIG. 1, according to an exemplary embodiment.
Figure 3:
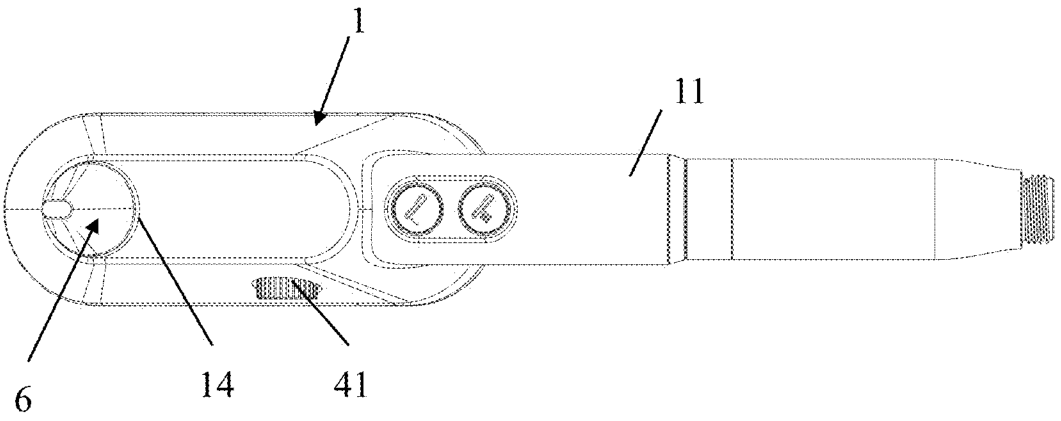
FIG. 3 is a top view of the shower device of FIG. 1, according to an exemplary embodiment.
Figure 4:
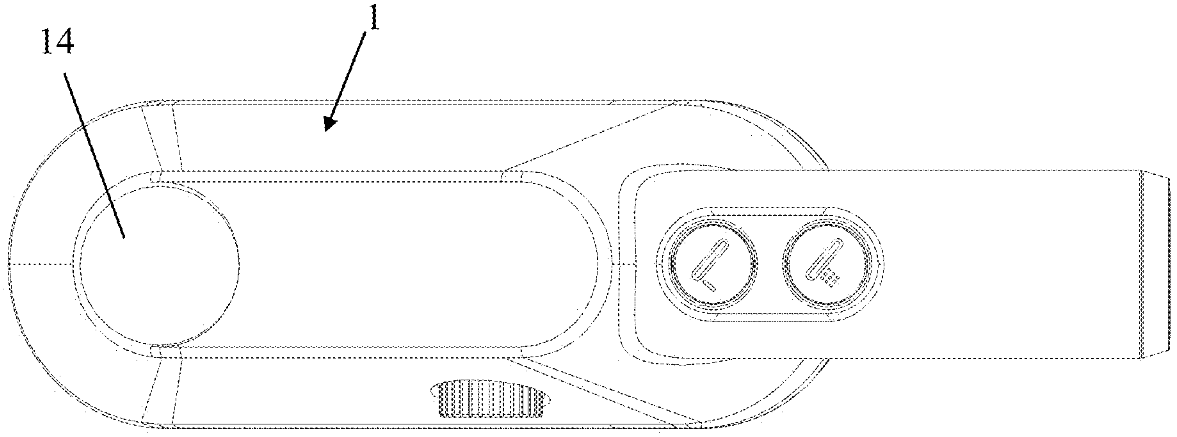
FIG. 4 is a detailed view of the shower device of FIG. 1, according to an exemplary embodiment.
Figure 5:
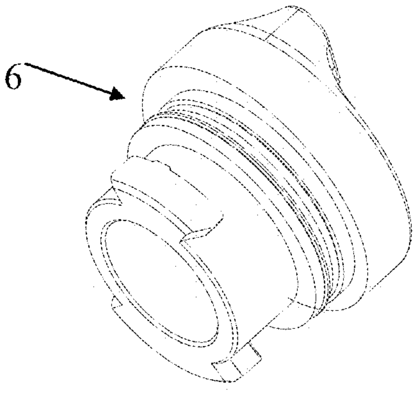
FIG. 5 is a perspective view of a plug cap of the shower device of FIG. 1, according to an exemplary embodiment.

Before turning to the FIGURES, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the FIGURES, an exemplary embodiment of a shower device including a shower device body with a body water channel, a shower head with spray holes, and a storage box for storing a cleaning liquid is shown. A user can open a control valve as needed, and the cleaning liquid is mixed with water and sprayed out through spray holes of a shower head. The cleaning liquid is uniformly distributed to a cleaning area along with the water flow, and there is no need to repeatedly take the cleaning liquid, thus improving convenience.

The shower head is connected to the shower device body and the spray holes are fluidly coupled to the body water channel. The storage box has a liquid inlet and a liquid outlet. The storage box is installed in the shower device body, and the liquid inlet and the liquid outlet are fluidly coupled to the body water channel respectively. A control valve is installed in the liquid inlet for controlling an on-off of the liquid inlet, and a one-way valve is installed in the liquid outlet. The liquid inlet is located upstream of the liquid outlet in a direction of water flow from the body water channel. In a direction of water flow from the body water channel, the storage box has an upstream end and a downstream end that are opposite to each other. Both the liquid inlet and the liquid outlet are located at the upstream end of the storage box, and the liquid outlet is arranged next to the liquid inlet.

The storage box has a liquid refill port on it, and a plug cap is removably coupled to the liquid refill port. The liquid refill port is disposed on a side of the storage box. An avoidance port is disposed on a side of the shower device body to avoid the plug cap.

The control valve includes a knob and a rotary valve core connected to the knob. The rotary valve core may pivot in the liquid inlet and is configured to control the on-off of the liquid inlet. The shower device body is provided with a body through hole on a side of the shower device body, and the knob is located in the body through hole.

The liquid inlet is coupled to a sleeve, and a first opening coupled to the body water channel and a second opening coupled to a cavity of the storage box are disposed on a circumferential surface of the sleeve. The rotary valve core may pivot in the sleeve. The rotary valve core includes a valve core recess on a circumferential surface and is configured to control an on-off of the first opening and the second opening. When the control valve is in an open state, the first opening communicates with the second opening through the valve core recess. When the control valve is in a closed state, the valve core recess breaks the communication between the first opening and the second opening. The rotary valve core is connected to two seal rings arranged at intervals along an axial direction, and the valve core recess is disposed between the two seal rings.

The storage box has a storage box recess on a side facing the shower head, and the shower head has a shower head recess on a side facing the storage box. The storage box recess is adjacent the shower head recess to form at least a part of the body water channel. The storage box is mounted in the shower device body. The storage box is used for storing the cleaning liquid, and the liquid inlet and the liquid outlet of the storage box are fluidly coupled to the body water channel respectively. The control valve is mounted in the liquid inlet so that the user can control the on-off of the liquid inlet. A one-way valve is mounted in the liquid outlet to prevent water in the body water channel from flowing backward into the storage box, and to prevent the cleaning liquid in the storage box from flowing out automatically. When using the shower device, the user opens the control valve, water may enter the storage box through the liquid inlet in order to mix with the cleaning liquid. The mixed cleaning liquid enters the body water channel through the liquid outlet and sprays out through the spray holes of the shower head. The cleaning liquid is uniformly distributed to the cleaning area along with the water flow, and the user does not need to take the cleaning liquid repeatedly, thus improving convenience.

Referring to FIGS. 1 to 2 and FIGS. 6 to 11, a shower device is shown according to an exemplary embodiment and includes a shower device body 1 with a body water channel 12, a shower head 2 with spray holes 21, and a storage box 3 for storing a cleaning liquid. The shower head 2 is connected to the shower device body 1, and the spray holes 21 are fluidly coupled to the body water channel 12. The storage box 3 has a liquid inlet 31 and a liquid outlet 33. The storage box 3 is installed in the shower device body 1, and the liquid inlet 31 and the liquid outlet 33 fluidly coupled to the body water channel 12 respectively. The shower device also includes a control valve 4 used for controlling an on-off of the liquid inlet 31 that is installed in the liquid inlet 31. The shower device also includes a one-way valve 5 and is installed in the liquid outlet 33.

A pipe 11 is connected to one end of the shower device body 1 and is configured to be fluidly coupled to a water pipe. The shower device body 1 includes a cavity, and the body water channel 12 is a portion of the cavity. Water in the pipe 11 can enter into the body water channel 12.

The shower head 2 has a plurality of spray holes 21. The shower head 2 is connected to a side of the shower device body 1, and each spray hole 21 is fluidly coupled to the body water channel 12. The water in the body water channel 12 is sprayed out through the spray holes 21.

The storage box 3 is used to store the cleaning liquid. The storage box 3 is mounted in the cavity of the shower device body 1. The storage box 3 is removably coupled to the shower device body 1, e.g., by screws, snaps, etc. On the side of the storage box 3 facing the body water channel 12, there are a liquid inlet 31 and a liquid outlet 33. Both the liquid inlet 31 and the liquid outlet 33 are fluidly coupled to the body water channel 12. Water in the body water channel 12 may enter the storage box 3 through the liquid inlet 31 and may be mixed with the cleaning liquid. The mixed cleaning liquid may be discharged into the body water channel 12 through the liquid outlet 33, and then be discharged out through the spray holes 21.

Figure 6:
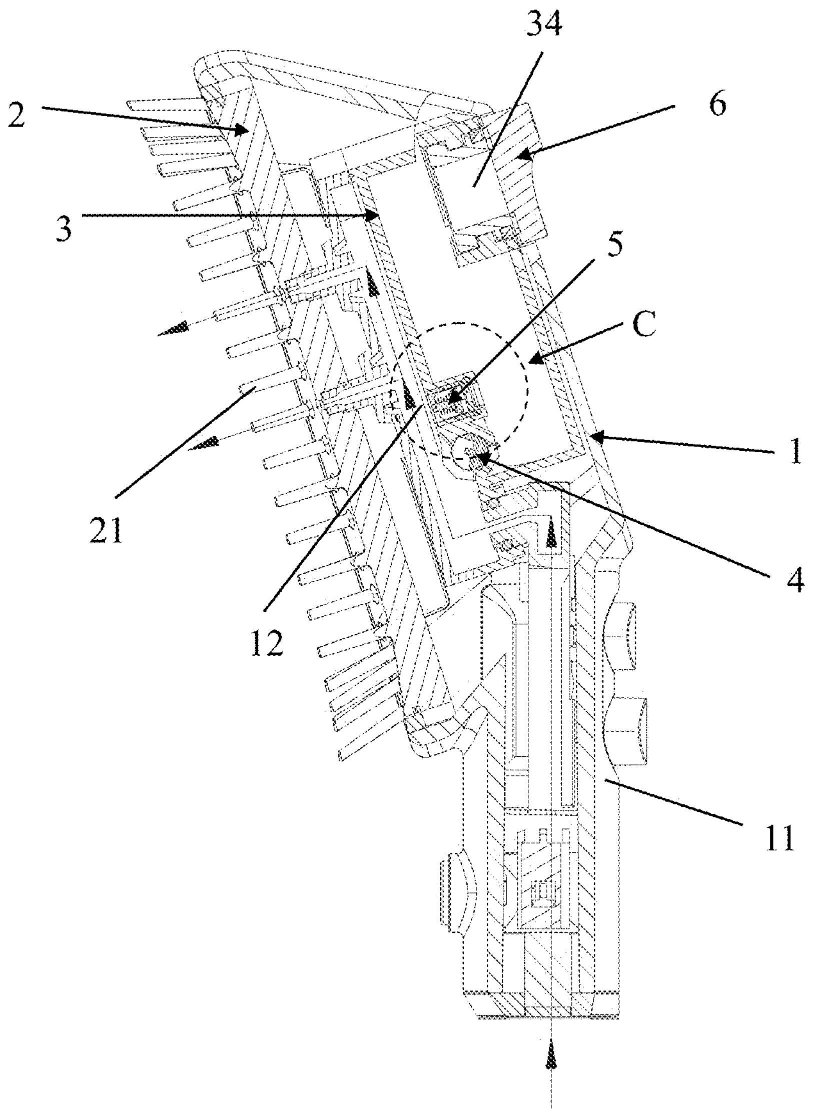
FIG. 6 is a cross-sectional view of the shower device of FIG. 1, according to an exemplary embodiment.
Figure 8:
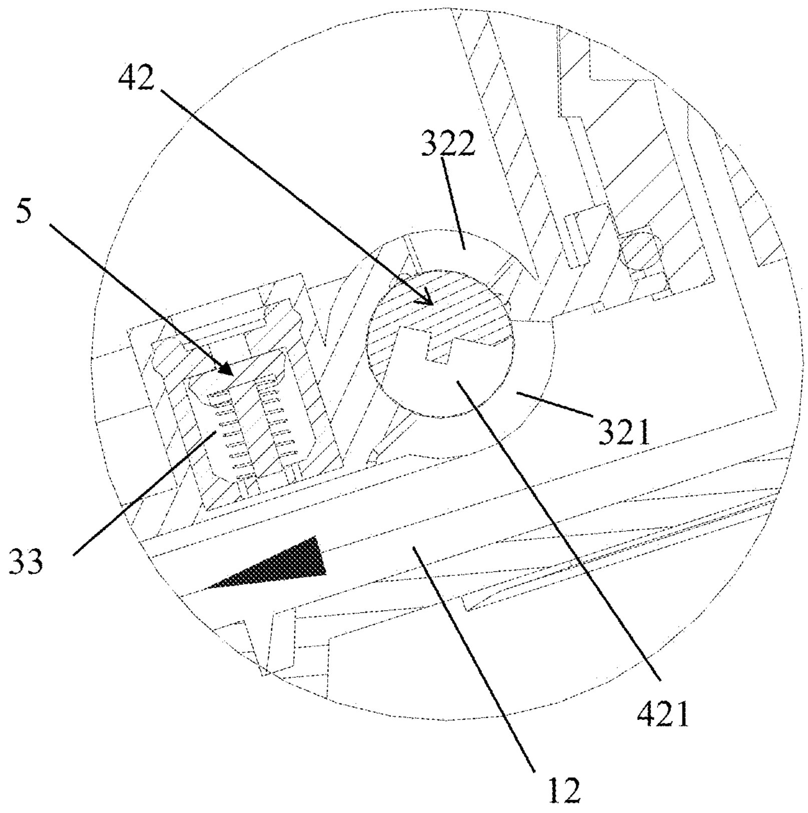
FIG. 8 is a detailed view of area C of the shower device of FIG. 1, according to an exemplary embodiment.

The control valve 4 is installed in the liquid inlet 31 for controlling the opening and closing of the liquid inlet 31. The control valve 4 can employ a valve such as a solenoid valve or a mechanical valve, etc. The one-way valve 5 is installed in the liquid outlet 33 to prevent the cleaning liquid in the storage box 3 from automatically flowing out, and also to prevent the water in the body water channel 12 from flowing backward into the storage box 3. The one-way valve 5 can open automatically under the water pressure. For example, the one-way valve 5 opens when the water pressure is higher than a preset value. The one-way valve 5 closes when the water pressure is lower than a preset value. The preset value may be determined by the spring in the one-way valve 5. As shown in FIGS. 6 and 8, when the user does not need to use cleaning liquid when spraying, the control valve 4 can be closed, and the water in the pipe 11 enters into the body water channel 12 and is then sprayed out through the spray holes 21.

Figure 7:
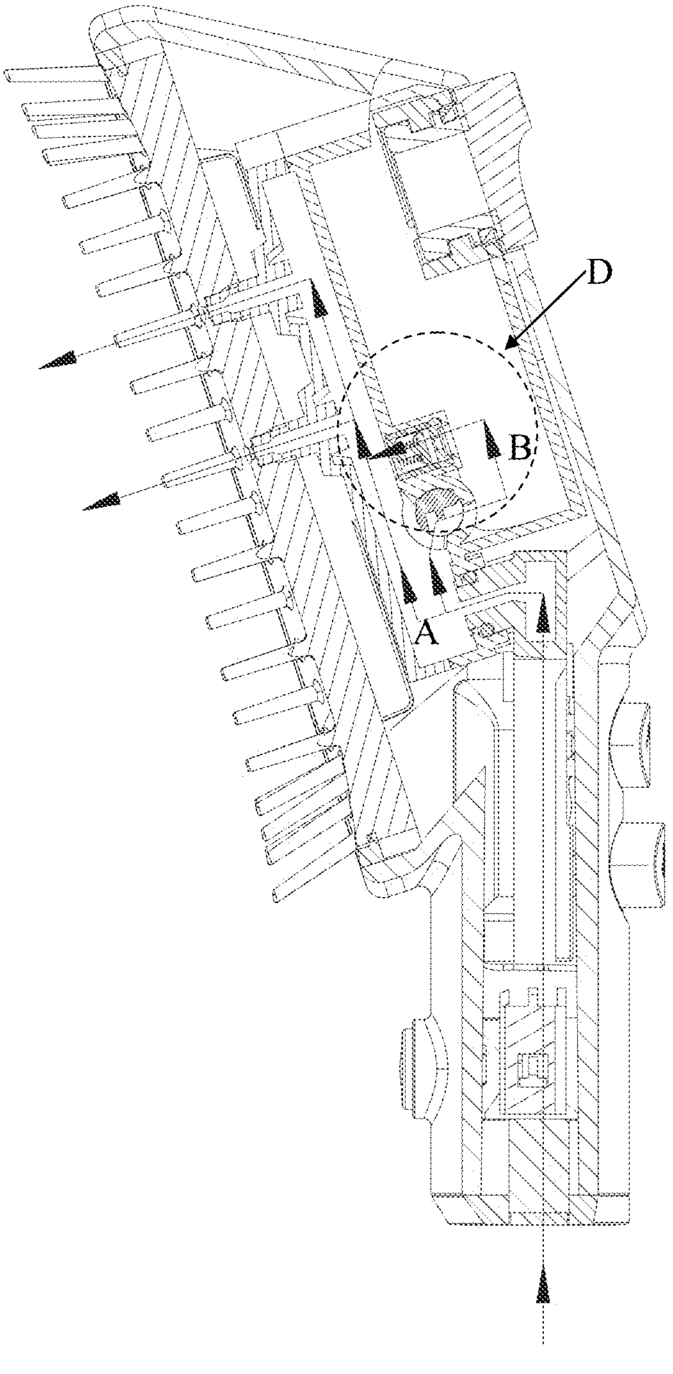
FIG. 7 is another cross-sectional view of the shower device of FIG. 1, according to an exemplary embodiment.
Figure 9:
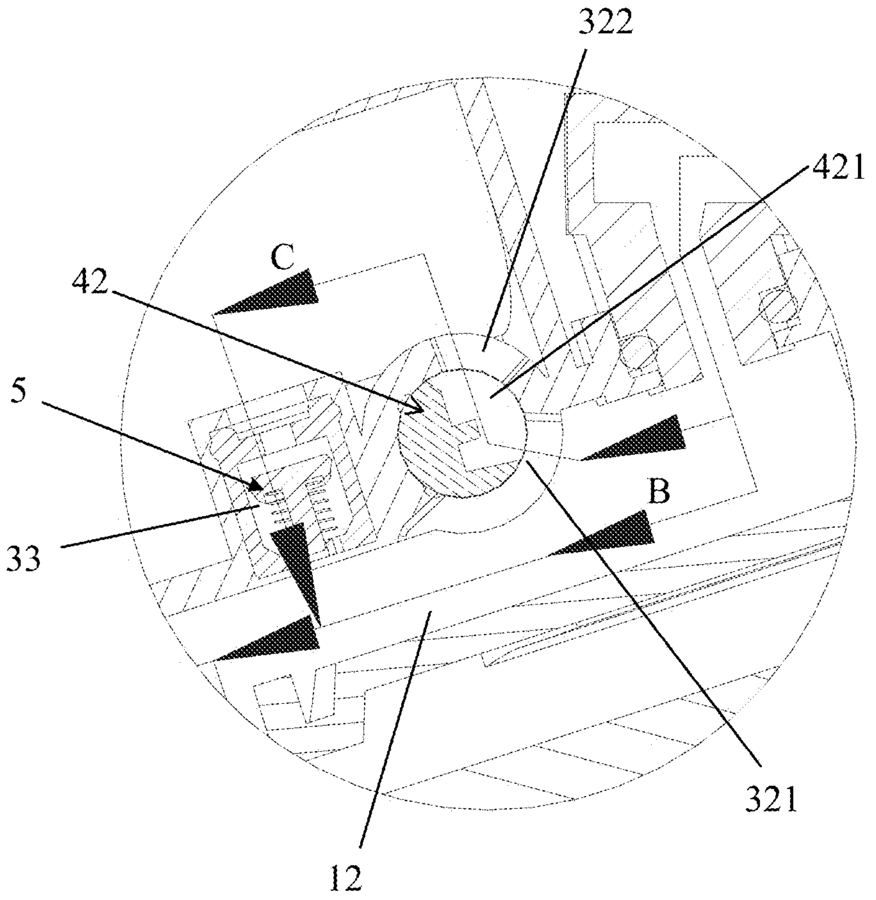
FIG. 9 is a detailed view of area D of the shower device of FIG. 1, according to an exemplary embodiment.
Figure 10:
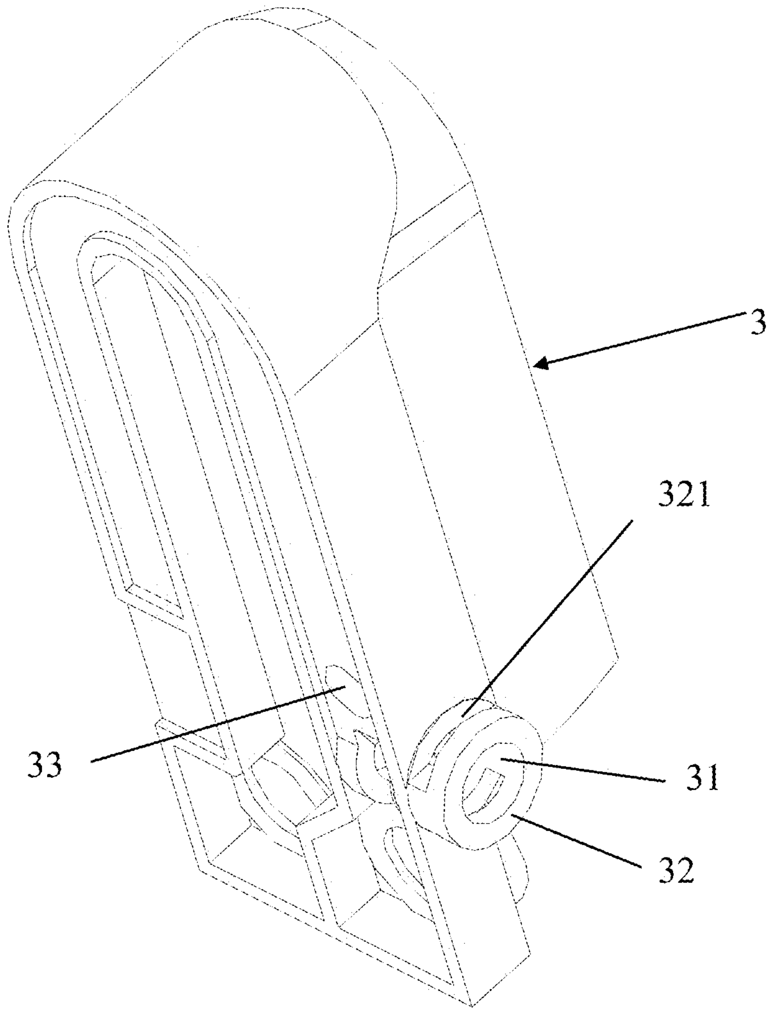
FIG. 10 is a perspective view of a storage box of the shower device of FIG. 1, according to an exemplary embodiment.
Figure 11:
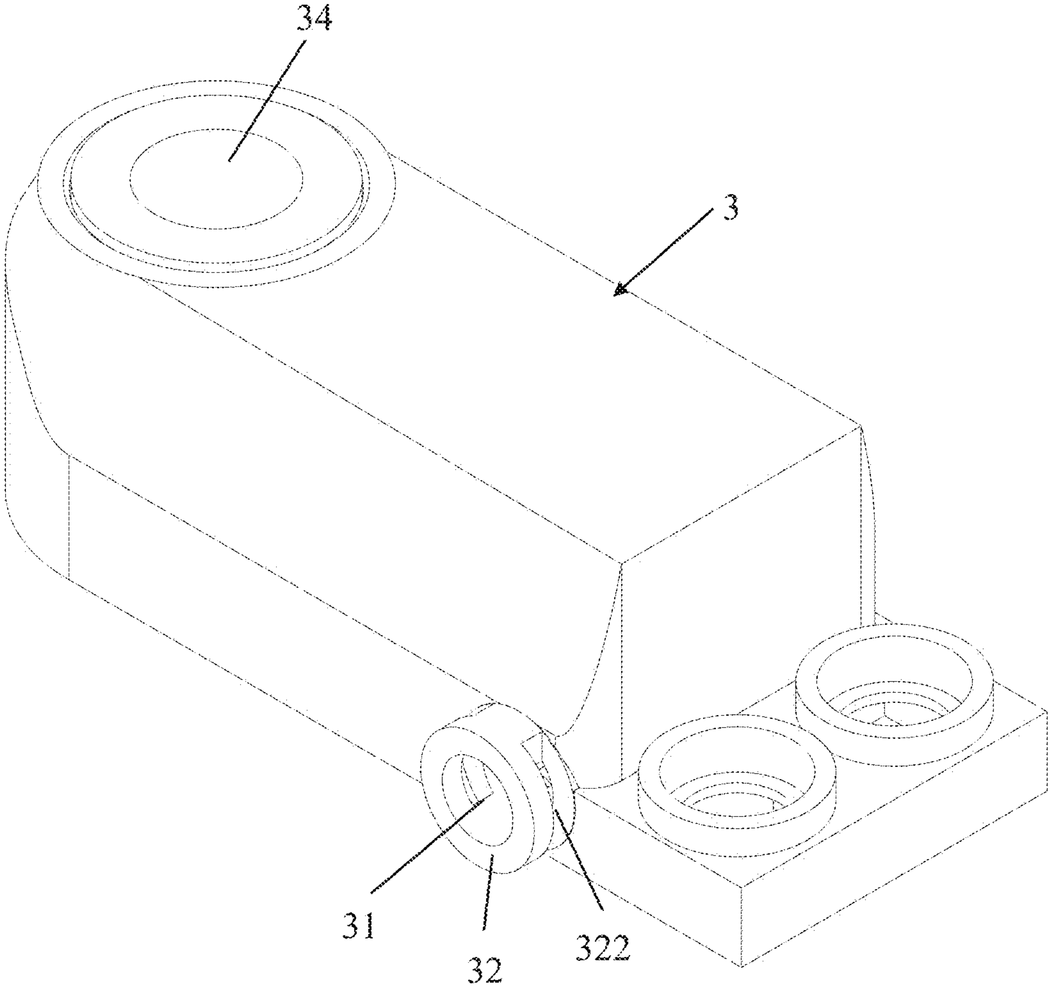
FIG. 11 is another perspective view of the storage box of the shower device of FIG. 1, according to an exemplary embodiment.

As shown in FIGS. 7 and 9, when the user needs to use the cleaning liquid, the control valve 4 is opened, the liquid inlet 31 is opened, a portion of the water continues to flow in the body water channel 12 along arrow A, and a portion of the water enters into the storage box 3 along arrow B to be mixed with the cleaning liquid. At the same time, the water pressure in the storage box 3 is increased, and the one-way valve 5 is automatically opened to open the liquid outlet 33 under the action of water pressure. The mixed cleaning liquid enters the body water channel 12 through the liquid outlet 33 and is sprayed out through the spray holes 21 of the shower head 2. The cleaning liquid is uniformly applied to the cleaning area along with the water flow, and the user does not need to take the cleaning liquid repeatedly, thus improving convenience.

As shown in FIGS. 6 to 9, the liquid inlet 31 is located upstream of the liquid outlet 33 in the direction of water flow from the body water channel 12. The cleaning liquid discharged from the liquid outlet 33 is downstream of the liquid inlet 31 and is sprayed out from the spray holes 21 with the water from the body water channel 12. Water with the cleaning liquid discharged from the liquid outlet 33 does not flow back to the storage box 3 through the liquid inlet 31.

Still referring to FIGS. 6 to 9, in a direction of water flow from the body water channel 12, the storage box 3 has upstream and downstream ends. Both the liquid inlet 31 and the liquid outlet 33 are located at the upstream end of the storage box 3, and the liquid outlet 33 is disposed adjacent to the liquid inlet 31. The cleaning liquid discharged from the liquid outlet 33 flows downstream along with the water from the body water channel 12, and enables the cleaning liquid to be discharged from a greater number of spray holes 21 to be sprayed out evenly.

As shown in FIGS. 2 to 6 and FIG. 11, the storage box 3 is provided with a liquid refill port 34, and a plug cap 6 is removably connected in the liquid refill port 34. By configuring the liquid refill port 34 on the storage box 3, it is convenient for a user to refill the storage box 3 with cleaning liquid. When refilling the cleaning liquid, the plug cap 6 is unscrewed, and after the refilling is completed, the plug cap 6 is tightened. The liquid refill port 34 is located at the back of the storage box 3. In order to facilitate the removal and installation of the plug cap 6, the avoidance port 14 is provided on the back of the shower device body 1, and the plug cap 6 is disposed in the avoidance port 14 or protrudes out from the avoidance port 14 for the user to hold and operate.

As shown in FIGS. 1 to 2 and FIGS. 6 to 12, the control valve 4 is a mechanical valve including a knob 41 and a rotary valve core 42 connected to the knob 41. The rotary valve core 42 may pivot in the liquid inlet 31 and is capable of controlling the on-off of the liquid inlet 31. The shower device body 1 is provided with a body through hole 13 on a side of the shower device body 1 corresponding to the liquid inlet 31, and the knob 41 is located in the body through hole 13. The rotary valve core 42 is assembled in the liquid inlet 31, which can open and close the liquid inlet 31 via rotation. The knob 41 is connected to the rotary valve core 42, and both of them can be rotated as one piece. The knob 41 is in clearance fit with the body through hole 13, and an end of the knob 41 extends out from the body through hole 13 for a user to hold and rotate the knob 41.

In the initial state, the rotary valve core 42 closes the liquid inlet 31. When the user holds the knob 41 and rotates the knob 41 by a preset angle, the rotary valve core 42 opens the liquid inlet 31. When the user rotates the knob 41 by a preset angle in the reverse direction, the rotary valve core 42 closes the liquid inlet 31 again.

As shown in FIGS. 2 and 6 to 12, the liquid inlet 31 is connected to a sleeve 32, and one end of the sleeve 32 is connected to a housing of the storage box 3. A first opening 321 connected to the body water channel 12 and a second opening 322 connected to a cavity of the storage box 3 are disposed on a circumferential surface of the sleeve 32. The rotary valve core 42 includes a valve core recess 421 on the circumferential surface of the rotary valve core 42. The rotary valve core 42 may pivot in the sleeve 32, and the rotary valve core 42 may be disposed in the sleeve 32 in a clearance fit or be coupled to the sleeve 32 through a rotation shaft. The valve core recess 421 is used to control the on-off of the first opening 321 and the second opening 322. When the control valve 4 is in a closed state, the knob 41 is in an initial position. The circumferential surface of the rotary valve core 42 blocks the second opening 322, the valve core recess 421 leaves the second opening 322, the valve core recess 421 breaks the communication between the first opening 321 and the second opening 322, and water from the body water channel 12 does not enter into the storage box 3. When the control valve 4 is in the open state, the user rotates the knob 41 by a preset angle, the valve core recess 421 of the rotary valve core 42 connects the first opening 321 with the second opening 322, and the water from the body water channel 12 can enter into the storage box 3.

Figure 12:
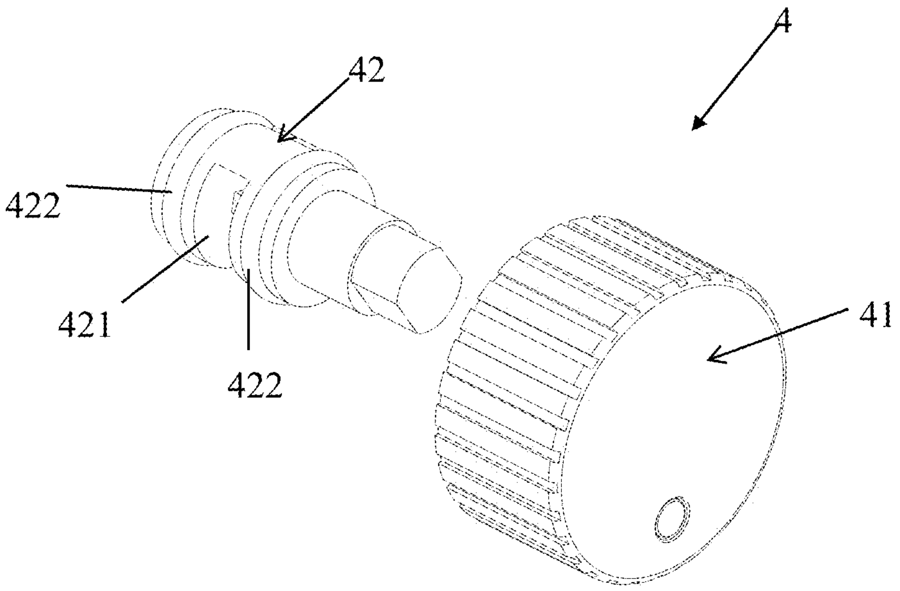
FIG. 12 is an exploded view of a knob and a rotary valve core of the shower device of FIG. 1, according to an exemplary embodiment.

Referring to FIG. 12, the rotary valve core 42 is coupled to two seal rings 422 arranged at intervals along an axial direction. The valve core recess 421 is disposed between the two seal rings 422, and the two seal rings 422 serve as a sealing effect to prevent water from flowing away from the both ends of the valve core recess 421.

Figure 13:
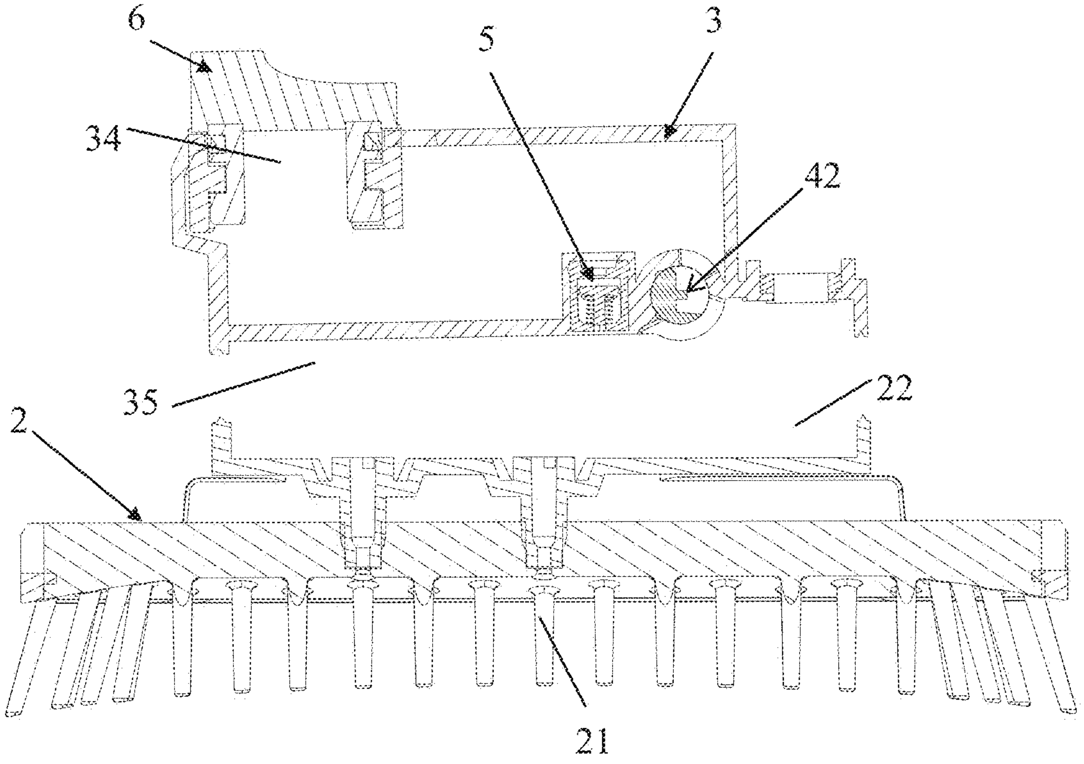
FIG. 13 is an exploded view of the storage box and a shower head of the shower device of FIG. 1, according to an exemplary embodiment.

Referring to FIG. 13, the storage box 3 has a storage box recess 35 on the side facing the shower head 2, and the shower head 2 has a shower head recess 22 on the side facing the storage box 3. The storage box recess 35 is adjacent to the shower head recess 22 to form at least a part of the body water channel 12.

As utilized herein with respect to numerical ranges, the terms "approximately," "relative to," "substantially," and similar terms generally mean+/−10% of the disclosed values, unless specified otherwise. As utilized herein with respect to structural features (e.g., to describe shape, size, orientation, direction, relative position, etc.), the terms "approximately," "relative to," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure. In addition, the terms "first", "second" and "third" are used for descriptive purposes only and are not to be construed as indicating or implying relative importance.

Although the figures and description may illustrate a specific order of method steps, the order of such steps may differ from what is depicted and described, unless specified differently above. Also, two or more steps may be performed concurrently or with partial concurrence, unless specified differently above.

What is claimed is:

1. A shower device, comprising:

a shower device body comprising:

- a body port is provided on a first side wall of the shower device body;
- a body water channel;
- a shower head comprising spray holes, wherein the shower head is connected to the shower device body, and wherein the spray holes are fluidly coupled to the body water channel;
- a storage box for storing a cleaning liquid, wherein the storage box comprises a liquid inlet and a liquid outlet, wherein the storage box is installed in the shower device body, wherein the liquid inlet and the liquid outlet are each fluidly coupled to the body water channel, wherein an exterior of the storage box forms a portion of the body water channel; wherein the storage box comprises a liquid refill port on a side wall of the storage box and the liquid refill port is concentrically aligned with the body port;

a plug cap is aligned with and disposed through the body port and removably connected to the liquid refill port;

a control valve installed in the liquid inlet and configured to control opening and closing of the liquid inlet; and a one-way valve installed in the liquid outlet.

2. The shower device according to claim 1, wherein the liquid inlet is located upstream of the liquid outlet.

3. The shower device according to claim 2, wherein:

the storage box has an upstream end and a downstream end opposite the upstream end;

both the liquid inlet and the liquid outlet are located at the upstream end of the storage box; and the liquid outlet is disposed adjacent to the liquid inlet.

4. The shower device according to claim 1, wherein:

the control valve comprises a knob and a rotary valve core connected to the knob;

the rotary valve core is configured to pivot in the liquid inlet and is configured to control opening and closing of the liquid inlet;

the shower device body comprises a body through hole on a second side wall of the shower device body; and the knob is disposed in the body through hole.

5. The shower device according to claim 4, wherein:

the liquid inlet is connected to a sleeve, and a first opening coupled to the body water channel and a second opening coupled to a cavity of the storage box are disposed on a circumferential surface of the sleeve;

the rotary valve core is configured to pivot in the sleeve, and the rotary valve core comprises a valve core recess on a circumferential surface of the rotary valve core configured to control opening and closing of the first opening and the second opening;

when the control valve is in an open state, the first opening is coupled to the second opening through the valve core recess; and when the control valve is in a closed state, the valve core recess breaks communication between the first opening and the second opening.

6. The shower device according to claim 5, wherein the rotary valve core is coupled to two seal rings arranged at intervals along an axial direction, and wherein the valve core recess is disposed between the two seal rings.

7. The shower device according to claim 1, wherein the storage box has a storage box recess on a side of the storage box facing the shower head, wherein the shower head has a shower head recess on a side of the shower head facing the storage box, and wherein the storage box recess is adjacent to the shower head recess to form the portion of the body water channel.

* * * * *